United States Patent [19]

Satterwhite et al.

[11] 3,954,953

[45] May 4, 1976

[54] ENERGY CONSERVING PROCESS FOR MANUFACTURING FERRIC SULFATE

[75] Inventors: William A. Satterwhite, Englishtown; Robert M. Leach, Hightstown, both of N.J.

[73] Assignee: Cities Service Company, Tulsa, Okla.

[22] Filed: July 31, 1974

[21] Appl. No.: 493,285

[52] U.S. Cl............................... 423/558; 423/146
[51] Int. Cl.²........................................ C01G 41/14
[58] Field of Search .......... 423/138, 140, 141, 146, 423/148, 558, 632; 75/24, 25

[56] References Cited
UNITED STATES PATENTS

| | | | |
|---|---|---|---|
| 1,644,250 | 10/1927 | Hart.................................. | 423/558 |
| 2,149,327 | 3/1939 | Wilson et al...................... | 423/558 |
| 2,173,144 | 9/1939 | Wilson et al...................... | 423/558 |
| 2,252,332 | 8/1941 | Plummer........................... | 423/558 |

FOREIGN PATENTS OR APPLICATIONS

| | | | |
|---|---|---|---|
| 251,961 | 5/1963 | Australia........................... | 423/558 |

*Primary Examiner*—Oscar R. Vertiz
*Assistant Examiner*—G. P. Straub
*Attorney, Agent, or Firm*—Howard M. Ellis

[57] ABSTRACT

A continuous process for producing granular ferric sulfate significantly reduces manufacturing time, increases product output through the elimination of the curing stage employed in batch-type processes, and because of reduced heat requirements consumes less energy during the final drying phase. At the initial aqueous phase of the process a low water-containing slurry or dispersion of iron oxide is reacted with only a portion of the total sulfuric acid required in the process to produce a ferric sulfate-containing slurry having unreacted iron oxide. That quantity of acid withheld from the aqueous phase is employed at the time of agglomeration of the ferric sulfate-containing slurry. By delaying use of the remaining acid to a later step in the process the heat of reaction generated from the conversion of the unreacted iron oxide in the slurry may be utilized for completing the reaction and for drying the granules. Thus, drying time is shortened and the consumption of supplemental fuel is greatly reduced.

13 Claims, No Drawings

1

ENERGY CONSERVING PROCESS FOR MANUFACTURING FERRIC SULFATE

BACKROUND OF THE INVENTION

This invention relates to an improved process for manufacturing ferric sulfate, and more particularly to a continuous high volume process for making a uniform granular, non-caking ferric sulfate while simultaneously eliminating protracted curing periods.

In addition to the foregoing, the process of the present invention advantageously has reduced energy requirements, taking significantly less supplemental fuel for product drying and completion of the reaction.

Since awareness of water quality has come to the forefront, higher standards of water purity have created added demand for flocculants and coagulants, such as ferric sulfate for water purification and sewage treatment. However, due to the use of relatively low volume methods for producing ferric sulfate which require protracted curing periods satisfaction of the greater demand has not been met.

The conversion of iron oxide to ferric sulfate with concentrated sulfuric acid results in a steaming exotherm which solidifies. Because acid treated iron oxide by the batch process agglomerates to a solid mass almost instantaneously, before the reaction has an opportunity to go to completion, the hardened material must subsequently age or cure at high temperature for several hours and then evacuated from the hot curing den and conveyed to subsequent hot curing dens in order to provide the desired completion of reaction. Ultimately, the finished product prepared by such batch technique exits in the form of a mixture of fines, granules and large hard set lumps which are very hygroscopic, difficult to crush and subject to severe caking during storage and subsequent shipment. As a result, customer complaint and shipment rejection are frequent and both chemical and physical quality are difficult and costly to maintain. Typical batch processes as practiced are high in maintenance and labor and unadaptable to automatic controls through machinery and instrumentation.

Other factors have also contributed to the generally low output level and quality of ferric sulfate being produced. For example, not all available iron oxide-containing materials have been considered satisfactory as feedstocks for making ferric sulfate, but only those in the form of extremely finely divided dusts or powders. Coarser iron oxides in the form of waste heat boiler solids, iron roaster calcines, etc., have been unacceptable mainly because of their poor rate of reactivity by the batch process, and therefore, have not been utilized, notwithstanding their abundant supply and low cost.

It has not been discovered that high quality, granular ferric sulfate which is non-caking, uniform in size and consistent in chemical compositon may be prepared continuously in significantly greater quantities over shorter time periods through the elimination of prolonged curing times. Furthermore, it has been found that by maintaining the initial aqueous phase in manufacturing ferric sulfate the reaction can be more rapidly completed and readily controlled by instrumental control equipment. Further, by delaying a portion of the acid reactant to a subsequent step of the process important savings in fuel employed in the drying phase are realized.

Copending application Ser. No. 466,093, filed May 2, 1974, by William A. Satterwhite and Rober M. Leach also described an improved process for the manufacture of ferric sulfate. That process, unlike the one disclosed herein, employs an iron oxide slurry having a higher water content, and further, requires the utilization of all acid during the aqueous phase of the process. The process of the copending application increases product output by employing a high aqueous iron oxide slurry in the initial phase of the process. Because substantially all the iron is converted to ferric sulfate during this phase protracted curing periods are eliminated.

Earlier efforts in manufacturing ferric sulfate have been limited to less productive, high cost batch-type processes. One typical method calls exclusively for finely divided ferric oxide dust mixed with a small amount of water and the entire amount of concentrated sulfuric acid. The mass steams, dries and hardens within seconds from the heat generated by the exothermic characteristic of the reaction. Because solidification is rapid, evacuation of the mixer to a series of curing dens is required where up to twenty one days are necessary for the product to cure. The finished cured product consists of a mixture of substandard dusty fines, large and irregular shaped hard lumps. Large denning areas are needed and cost of evacuating, milling and screening of the cured product are high.

Previous efforts to employ other sources of iron oxide having coarser consistencies than finely divided dusts have failed. Moreover acids other than concentrated sulfuric acid have been unsatisfactory for use in batch operations, mainly because sufficient heat was not generated during the initial reaction to produce a solid, handable mass for curing.

Accordingly, it is the principal object of the present invention to provide a continuous, high volume, reduced energy consuming process for preparing quality, uniform granules of ferric sulfate over shortened time periods.

It is a further object of the present invention to provide a continuous high output method of manufacturing ferric sulfate which eliminates the need of prolonged curing periods.

A still further object of the instant invention is to provide a continuous process of making ferric sulfate granules which enables utilizing a wide variation of forms of iron oxide-containing materials as feedstocks.

Yet still another object of the invention is a process which enables use of a wide range of grades of sulfuric acid and to utilize the sulfuric acid at those points of the process to complete the manufacture most expediciously.

These and other objects features and advantages of this invention will become apparent to those skilled in the art after a reading of the following more detailed description.

PREFERRED EMBODIMENTS OF THE INVENTION

The present invention relates to a high volume method of manufacturing anhydrous or hydrated ferric sulfate having a water content from 0 to 6 moles per mole of ferric sulfate.

Broadly, the invention is concerned with a continuous, high volume, reduced energy consuming process for manufacturing ferric sulfate while eliminating protracted curing periods. The process comprises the steps of converting a substantial portion of the total iron in a reaction mixture to a ferric sulfate-containing slurry during an aqueous phase, wherein the reaction mixture comprises the use of the required sulfuric acid, generally in an amount ranging from about 30 to about 80% of the total acid used in the process, and a slurry consisting essentially of iron oxide and a sufficient amount of water to maintain the total iron content of the mixture during the aqueous phase at between 18 and 25%. The partially converted reaction mixture still containing a residual amount of unreacted iron oxide is agglomerated into uniform, spherical granules and the balance of the sulfuric acid, usually about 20 to about 70% withheld from the aqueous phase, is dispersed onto the agglomerated slurry. The addition of the final sulfuric acid at the time of agglomeration generates further heat, which when used with some external source of supplemental heat operates to flash off water remaining in the granules, and simultaneously converts the unreacted iron oxide to solid ferric sulfate. Conversion rates of the iron oxide to the sulfate range up to about 96% of the total iron present. It has been observed that withholding a portion of the acid for use during the agglomeration phase the heat of reaction generated by its delayed use operates to reduce the supplemental heat requirements needed in final drying of the ferric sulfate granules.

More specifically, the aqueous phase of the process involves the reaction of an iron oxide-containing material in the form of an aqueous slurry with a sulfuric acid at elevated temperature. Throughout the aqueous phase the water content of the slurry is maintained at a level sufficient to keep the iron content at between about 18 and 25%, and more preferably, at about 20 to about 22%. Dispersions of more than 25% total iron become too viscous to efficiently handle in a fluid phase, and therefore, are unsatisfactory for use by conventional conveying pumps. Correspondingly, slurries having excessively high levels of water wherein the iron content is below 18% operate to dilute the acid so that heat of the reaction is not fully utilized. Furthermore, such high water levels necessitate longer drying times and use of more energy during the drying phase.

For purposes of the present invention the iron oxide slurry used in the reaction mixture may be prepared in-situ. That is to say, the charge of the oxide to a reaction vessel as the reaction progresses may consist of the dry, water-free iron oxide feedstock, which in turn is contacted and diluted with water during the mixing in the reaction vessel itself to make the slurry. In this case, it has been found especially convenient to feed the dry iron oxide discharged as a solid from roasters or from a shipment of dry ore as the acid and water are also fed continuously to the reaction vessel. However, regardless of whether the iron oxide-containing slurry is prepared in-situ or used as a dry concentrate or prepared as a diluted slurry prior to charging the reaction vessel, the presence of water in the acid should be taken into account when adjusting the level of iron in the reaction mixture, in accordance with the present invention.

Iron oxide as used in the reaction mixture of the disclosed process encompasses both ferric and ferrous iron, as well as magnetite and other forms of iron oxides. Minor quantities of silica, usually 5% or less and trace amounts of various other impurities such as oxides of lead, zinc, copper and the like, may also be present in the iron oxide. Generally, oxides employed in the process are composed predominantly of ferric oxide, and more specifically, ferric oxide in amounts ranging usually from about 70 to about 99%. However, it has been found suitable for the iron oxide to contain minor quantities of ferrous oxide, generally in a range from about 0.5 to about 7%, but more preferably, from about 2 to about 5%. However, higher quantities of ferrous bearing oxides can be used and oxidation to ferric can be achieved in the process.

Practice of the process is not limited to finely divided iron oxide dusts and powders as feedstocks. Advantageously, coarser, less reactive iron oxides can be fully utilized. Typically, both dusts and coarser oxides of iron are formed as by-products in the roasting of sulfur-containing concentrates isolated during the separation and concentration of iron, zinc and copper bearing ores. In one such process of roasting, an iron sulfide concentrate is heated to drive off sulfur and the iron sulfide is converted to iron oxide. Part of this oxide is composed of fine particles and may be recovered from roaster gases by cyclones and final gas purification scrubbers. In addition, an important and more plentiful source of the iron oxide is collected as coarse dry calcine directed to belt conveyors from the roaster. Besides roaster calcine, other important sources of iron oxide are iron thickener underflow recovered during iron roasting, and waste heat boiler solids collected from hot gas cooling during iron roasting.

Thus, iron oxides used in the reaction mixture comprising predominately ferric oxide and lesser amounts of ferrous iron, etc., are employed as coarse powders or dusts, calcines, boiler solids, iron thickener and mixtures thereof. Included are also rusted steel scale or naturally occurring iron oxide. In the present invention, mesh or particle size of the oxide in the aqueous phase is not a critical factor in converting the iron to ferric sulfate. From about 30 to about 80% of the total iron during the aqueous phase reacts with sulfuric acid. Because the iron oxide in the form of dust or powdery-like materials is generally more reactive than, for example, coarser roaster calcine the reaction time for the latter type material may be somewhat longer, upwards to 4 or perhaps even 8 hours.

However, to some extent higher reaction temperatures in the aqueous phase are beneficial in countering the slower rate of reactiviity of coarser iron oxide feedstocks. Generally, the reacton in the aqueous phase is conducted at about 215° to about 250°F, and more preferably, at about 235° to about 245°F. By operating at the upper end of the temperature range retention time of the mixture in the aqueous phase can be minimized.

The sulfuric acid employed in the reaction mixture is preferably concentrated, however, dilute aqueous may also be used. The concentration should preferably be at least 50% in order for the reaction to progress at a satisfactory rate. Because dilute acid in the range of about 50 to about 70% generates less heat in the mixture than a 96 to 98% concentrated acid, supplemental heat may be needed in the aqueous phase of the reaction to reach the desired temperature range. However, concentrated sulfuric acid, by itself, through its heat of dilution and exothermic reaction with iron oxide generates more than ample heat in accordance with the process so that supplemental heat ordinarily is not required.

The total amount of acid required on a stoichiometric basis in the process ranges from about 100 to about 110% of the stoichiometric amount of sulfuric acid employed in the reaction mixture based on the total ferric and ferrous iron content of the iron oxide feedstock. As previously mentioned, only a portion of the total acid is used during the aqueous phase of the process. The balance of the acid is employed during agglomeration of the ferric sulfate-containing slurry. Generally, from about 30 to about 80% of the total amount of the acid is added to the reaction mixture during the aqueous phase, and more specifically, from about 50 to about 70%. The mixture containing aqueous iron oxide slurry, sulfuric acid and any required make-up water is agitated. Vapors coming off are condensed and returned to the reactor.

During the aqueous phase the rection mixture is sampled and tested by standard iron analysis using the potassium dichromate method to determine when the majority of iron in the mixture has been converted to ferric sulfate. Generally, when about 30% to as high as 80% of the total iron in the mixture has been converted to ferric sulfate, and more specifically, from 55 to about 65% has been reacted the mixture can then be agglomerated. The steps of agglomeration and drying may be accomplished by any of several processes employed in, for example, pelletizing fertilizers, like those disclosed in U.S. Pat. Nos. 3,142,862 and 2,798,801. Typically, the hot aqueous ferric sulfatecontaining slurry is discharged into a rotary granulator having a bed of previously manufactured granules of ferric sulfate, coating the granules as they are rotated. It has been found preferable to apply the slurry to the granules by spraying it onto the bed.

The granulation process may be carried out sequentially whereby the previously manufactured granules are first coated with the slurry and then treated with the balance of the sulfuric acid withheld from the aqueous phase. However, it has been found advantageous to spray both the slurry and acid onto the granules simultaneously. The heat of reaction generated by the acid causes elevation of the temperature of the granules initiating further conversion of the unreacted iron oxide to ferric sulfate.

Although the rotary granulator may be equipped with means for drying the coated granules, as disclosed in the '801 patent, a conventional rotary dryer seperate from the granulator is especially preferred. The coated granules continuously discharged from the granulator are fed into the dryer where the remaining water is flashed off and conversion of the unreacted iron oxide to ferric sulfate is completed.

Any suitable means for firing the dryer may be used e.g., direct firing, etc., however, hot combustion gases in the dryer have proven to be an efficient means for prompt removal of water from the granules. In this regard, it has been discovered that drying times of 1 hour or less, and more desirably, 30 minutes or less can be achieved with drying gases at temperatures sufficient to raise the temperature of the granules to about 250° to about 350°F. In order to reach this temperature the exhaust gas leaving the dryer should be from about 250° up to about 360°F, and more preferably, from about 280° to 350°F. It has been found that the hardness of the finished granule diminishes to below about 7 kg. on a Stokes meter as the exhaust gas temperature exceeds 360°F. Therefore, in order to produce a granule with around 20% to about 23% water soluble iron having a hardness of at least about 7 kg., and ranging up to 11 or 12 kg., exhaust gas temperature should not exceed 360°F. Temperatures in excess of this maximum produce a softer, less desirable granule.

The heat from the dryer combined with the heat of reaction is sufficient to completely dry the granules by the time they arrive at the discharge end of the dryer. Normally, up to about 96% of the total iron in the reaction mixture is converted to ferric sulfate. At the discharge point the finished product comprises a mixture of both oversized and undersized granules, along with the desired size range of about minus 6 plus 16 mesh. The oversized granules are screeened out and crushed into smaller particles, whereupon the crushed oversized together with undersized particles are returned or recycled to the feed end of the granulator to absorb and convert newly produced slurry into granular form. A recycle ratio of about 2 to 4 parts recycle to one part slurry is employed, which is 3:1 to 6:1 on a dry basis.

The following specific examples demonstrate the process of the instant invention, however, it is to be understood that these examples are for illustrative purposes only and do not purport to be wholly definitive as to condition and scope.

EXAMPLE 1

PART A

A six liter, 316 s.s. heat jacketed reactor equipped with agitator, thermometer and vapor condenser was fed the following reactants based on 70% of the total acid in the reactor. Roaster calcine from an iron roaster at a rate of 5.2 grams per minute (includes make-up water) to maintain an iron content of about 21.5% and concentrated sulfuric acid (97%) at the rate of 6.9 grams per minute. Before adding the acid the iron oxide and water were vigorously agitated to insure a homogeneous slurry. The temperature of the reaction mixture was maintained at about 230°F for the period of the aqueous phase. Vapors coming off the mixture were collected, condensed and returned to the reactor. The process ran for about 9½ hours.

At intervals of from 1 to 2 hours the reaction mixture was sampled for a quantitive determination of both total iron in the slurry and soluble iron using the following technique.

TOTAL IRON ANALYSIS 10 ml of hydrochloric acid is added to the ferric sulfate-containing slurry, covered with a watch glass and heated on a steam bath. A 15% stannous chloride solution is added drop wise to the sample until the yellow color disappears. Then one drop in excess is added. The sample is removed from the heat and diluted to a volume of 50 ml with cold water. At one time, 10 to 15 ml of saturated mercuric chloride solution is added to the sample and diluted to about 200 ml with water. If the solution turns black upon standing for 1 to 15 minutes, too much stannous chloride was added and a new sample must be prepared. From 10 – 15 ml of barium diphenylamine sulfonate indicator solution is added to the sample and with a potassium dichromate solution standardized for iron titrated to a purple end point.

Calculations —

$$\% \ Fe = \frac{ml \ K_2Cr_2O_7 \times (gm \ Fe/ml \ K_2Cr_2O_7) \times 100}{sample \ weight}$$

$$g/l \text{ Fe} = \frac{\text{ml } K_2Cr_2O_7 \times (\text{gm Fe/ml } K_2Cr_2O_7)}{\text{ml sample}}$$

SOLUBLE IRON ANALYSIS

The procedure for determining the quantity of soluble iron in the sample is the same as the total iron analysis above. However, 0.5 grams of solid from a sample is first mixed and heated with 15 grams of water for 15 minutes and the insoluble material filtered out. The procedure for "total iron analysis" is then followed.

Table I below provides the results of nine analyses taken during the continuous run:

TABLE I

| Analysis | Operating Time (Hrs) | % (Fe Sol) | % (Fe Tot) | % Conversion Ferric Sulfate |
|---|---|---|---|---|
| 1 | 1.0 | 12.18 | 22.12 | 55.06 |
| 2 | 2.0 | 11.43 | 21.07 | 54.25 |
| 3 | 2.8 | 9.76 | 20.86 | 46.79 |
| 4 | 3.5 | 11.99 | 21.21 | 56.52 |
| 5 | 5.5 | 11.66 | 21.92 | 53.19 |
| 6 | 6.5 | 9.99 | 19.52 | 51.18 |
| 7 | 7.5 | 9.74 | 20.54 | 47.44 |
| 8 | 8.5 | 10.28 | 19.72 | 52.15 |
| 9 | 9.5 | 10.78 | 19.56 | 55.13 |

PART B

The ferric sulfate-containing slurry of Part A was agglomerated into granules and dried according to the following procedure. The slurry was pumped from the reactor and sprayed with the aid of steam into a rotary drum granulator containing a bed of ferric sulfate recycle material fed continuously into the granulator by a vibratory feeder. The remaining acid (30%) was sprayed onto the wet granules which were then fed into a bench size roto-louvre dryer where granule temperature was elevated to temperatures ranging from about 330° to 355°F. After a drying period of about 30 minutes the first batch of granules were discharged and screened, the oversize granules ground and returned to the feed hopper along with on-size material to provide new recycle. The final product consisted of firm, uniform size granules of ferric sulfate that were readily soluble in water.

Table II gives the analyses of the final material.

TABLE II

| Analysis | % Fe (Sol) | % Fe (Tot) | % Conv. | % Free Acid | % Insol |
|---|---|---|---|---|---|
| 1 | 22.92 | 24.72 | 92.72 | 1.43 | 4.33 |
| 2 | 23.31 | 24.56 | 94.91 | 2.34 | 5.09 |
| 3 | 22.94 | 25.04 | 91.61 | 1.74 | 4.68 |
| 4 | 23.05 | 25.12 | 91.76 | 1.39 | 4.47 |
| 5 | 23.27 | 25.54 | 91.31 | 2.70 | 4.50 |
| 6 | 22.75 | 24.82 | 91.66 | 4.00 | 5.07 |
| 7 | 22.83 | 24.71 | 92.39 | 3.31 | 4.12 |
| 8 | 22.73 | 24.63 | 92.29 | 4.06 | 4.19 |
| 9 | 22.64 | 24.42 | 92.71 | 4.37 | 4.00 |

EXAMPLE 2 – 8

Following the procedure of Example 1, part A, an aqueous slurry was prepared containing 21.30% iron. 65% of the total acid was added during the aqueous phase and the reaction temperature was maintained at 119°C. When about 59% of the total iron was converted to ferric sulfate the slurry was sprayed over ferric sulfate recycle granules simultaneously with the remaining acid. Analysis of the wet granules showed a soluble iron content of 17.54% with a total iron conversion of 84.17%. The granulated slurry was dried in accordance with the procedure of Example 1, part B. Table III provides drying and final product data.

TABLE III

Inlet Air Rate — 50 ft³/min.
Inlet Air Temperature — 950°F

| Example | Drying Time (min) | Inlet Air °F | Exhaust Air °F | Material Temp. °F Exit | Tot. Fe % | Sol. Fe % | Conv. % | Insol. % | Free Acid % | Hardness Kg |
|---|---|---|---|---|---|---|---|---|---|---|
| 2 | 12 | 965 | 313 | 303 | 22.40 | 19.87 | 88.71 | 6.01 | 4.72 | 7.2 |
| 3 | 15 | 958 | 325 | 303 | 22.75 | 20.24 | 88.97 | 6.22 | 4.12 | 8.7 |
| 4 | 20 | 952 | 338 | 314 | 23.62 | 21.16 | 89.59 | 5.77 | 4.30 | 8.1 |
| 5 | 25 | 948 | 349 | 321 | 24.92 | 22.37 | 89.77 | 5.51 | 3.59 | 7.2 |
| 6 | 30 | 942 | 362 | 335 | 24.88 | 22.39 | 89.99 | 4.23 | 3.52 | 6.8 |
| 7 | 33 | 945 | 378 | 350 | 25.06 | 22.89 | 91.34 | 5.15 | 3.36 | 6.2 |
| 8 | 36 | — | — | — | 25.03 | 23.27 | 92.97 | 4.68 | 3.09 | 5.9 |

Table III demonstrates that ferric sulfate granules of suitable hardness having the desired 20 to 22% soluble iron can be prepared with a drying cycle of thirty minutes or less. Granules exposed to exhaust air temperatures above 360°F did not achieve the desired degree of hardness. Granules of Examples 2–5 were firm and able to withstand considerable stress before cracking. They were unaffected by humidity and showed no tendency to set-up.

EXAMPLE 9

To demonstrate the fuel saving benefits of the invention (Process B) the total BTUs required to complete the reaction and to dry the final product may be compared against the heat requirements where the entire quantity of acid required is added during the initial reaction phase of the process (Process A).

On the basis of 1 ton of final product containing 24% total iron and 22% soluble iron as $Fe_2(SO_4)_3 \cdot 3H_2O$ (89.5%) the reaction may be shown as:

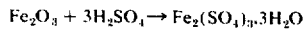

$$Fe_2O_3 + 3H_2SO_4 \rightarrow Fe_2(SO_4)_3 \cdot 3H_2O$$

Where $\Delta H_R$ = 440,000 BTU/ton $Fe_2(SO_4)_3 \cdot 3H_2O$ at 25°C

For a 91% conversion approximately 400,000 BTU/ton of $Fe_2(SO_4)_3 \cdot 3H_2O$ are generated during the reaction.

TABLE IV

| PROCESS A<br>100% of total acid to reactor | PROCESS B<br>65% of total acid to reactor |
|---|---|
| Conversion 9.76% of 13.90% total iron or 70% complete slurry = 9.76% sol. iron 70% × 400M BTU=*280M BTU | Conversion 12.9% of 21.5% total iron or 60% complete slurry = 12.9 sol. iron ∴ 60% × 400M BTU=*240M BTU |

*Total BTU expended in the reactor out of the 400,000 BTU from the heat of reaction.

The heat requirements (approximate) to raise the temperature of recycle material from 180° to 330°F, based on 4 tons/ton of final product ($q$) are expressed as $$q = WC_p\Delta T = (4\times 2000 \text{ lbs}) (0.26 \text{ BTU/lb./°F.}) (330°-180°F)$$

$q = 312,000$ BTU/ton (Process A and B)

The heat requirements (approximate) for new granules added as slurry ($q'$) where the temperature is increased from 230°F in the reactor to 330°F (drying temperature) are:

Process A $q' = (3530$ lbs slurry/ton ferric sulfate$) (0.62\text{BTU/lb/°F}) (330°F - 230°F)$ $q' = 219,000$ BTU/ton Process B $q' = (2230$ lbs slurry/ton ferric sulfate$) (0.26 \text{ BTU/lb/°F}) (330°F - 230°F)$ $q' = 82,500$ BTU/ton The latent heat ($\Delta H_1$) requirements (approximate) for drying the final product to 24.5% iron.

Process A $\Delta H_1 = (1500$ lbs $H_2O$/ton ferric sulfate$) (1020 $ BTU/lb $H_2O)$ $\Delta H_1 = 1,550,000$ BTU/ton ferric sulfate Process B Slurry has 21.5% iron and is diluted with remaining $H_2SO_4$ of 452 lbs. to 17.5% iron. Drying to 24.5% iron removes 800 lbs. $H_2O$/ton ferric sulfate.

$\Delta H_1 = (800$ lbs. $H_2O$/ton$) (1020$ BTU/lb $H_2O)$ $\Delta H_1 = 816,000$ BTU/ton ferric sulfate Comparative total heat requirements for Processes A and B are shown in Table V below.

TABLE V

| Heat Requirements | PROCESS A<br>BTU/ton ferric sulfate | PROCESS B<br>BTU/ton ferric sulfate |
|---|---|---|
| q | 312,000 | 312,000 |
| q' | 219,000 | 82,500 |
| ΔH₁ | 1,550,000 | 816,000 |
| Total | 2,081,000 | 1,210,500 |
| Heat of reaction — not utilized except to bring reactants to operating temperature of 230°F | 0 | 0 |
| Heat utilized in reaction occuring after the reactor | | |
| 70% to 91%=21%×400M BTU | 92,400 | |
| 60% to 91%=31%×400M BTU | | 136,400 |
| Heat of dilution of H₂SO₄ utilized | 0 | 108,500 |
| Total heat utilized | 92,400 | 244,900 |
| | 2,081,000 | 1,210,500 |
| | 92,400 | 244,900 |
| Total Heat Requirements (BTU) | 1,988,600 | 965,600 |

Table V demonstrates Process B of the present invention as providing an energy saving of more than 1 million BTU/ton of ferric sulfate produced over Process A.

While the invention has been described in conjunction with specific examples thereof, this is illustrative only. Accordingly, many alternatives, modifications and variations will be apparent to those skilled in the art in light of the foregoing description and it is therefore intended to embrace all such alternatives, modifications and variations as to fall within the spirit and broad scope of the appended claims.

We claim:

1. A continuous, process for manufacturing ferric sulfate without protracted curing periods which comprises (a) converting a substantial portion of the iron in a reaction mixture while in an aqueous phase to a ferric sulfate-containing slurry, wherein the reaction mixture comprises (1) a sulfuric acid having a concentration of at least 50% and in an amount ranging from about 30 to 80% of the total acid employed in the process and (2) a slurry consisting essentially of iron oxide comprised predominantly of ferric oxide and a sufficient amount of water to maintain the total iron content of the mixture during the aqueous phase at between about 18 and 25%, (b) agglomerating the ferric sulfate-containing slurry and dispersing on the agglomerates formed the remaining 20 to about 70% sulfuric acid, and (c) drying and converting substantially all the unreacted iron oxide of the said agglomerates to ferric sulfate.

2. The process of claim 1 wherein the water content of the reaction mixture during the aqueous phase is maintained at a level sufficient to keep the total iron content of said mixture at about 20 to 22%.

3. The process of claim 1 wherein from about 50 to about 70% of the total acid employed in the process is used in the aqueous phase.

4. The process of claim 1 wherein the total acid employed in the process ranges from about 100 to about 110% of the stoichiometric amount based on the total iron content of the reaction mixture.

5. The process of claim 1 wherein the acid is concentrated sulfuric acid.

6. The process of claim 1 wherein the acid is dilute aqueous sulfuric acid.

7. The process of claim 1 wherein the iron oxide of the aqueous slurry is material derived from iron containing ores and selected from the group consisting of iron oxide dust, roaster calcine, waste heat boiler solids and mixtures thereof.

8. The process of claim 1 wherein the ferric sulfate-containing slurry is agglomerated by coating previously prepared granules of ferric sulfate.

9. The process of claim 8 wherein the previously prepared granules of ferric sulfate are simultaneously coated with the ferric sulfate-containing slurry and remaining sulfuric acid.

10. The process of claim 1 wherein the agglomerated ferric sulfate is dried using hot combustion gases.

11. The process of claim 10 wherein the temperature of the combustion gases leaving the dryer is about 250° to about 360°F.

12. The process of claim 1 wherein the agglomerated ferric sulfate is dried for a period of 1 hour or less at temperatures sufficient to raise the temperature of the ferric sulfate to about 250° to about 350°F.

13. The process of claim 1 wherein the dried agglomerated ferric sulfate has a granule hardness of at least about 7 kg and a soluble iron content of about 20 to about 23%.

* * * * *